April 13, 1965

A. H. JACOMET 3,178,153

FIRE RETARDER AND OIL BARRIER

Filed May 3, 1963

INVENTOR.
ARTHUR H. JACOMET

BY

Herschel C. Omohundro

ATTORNEY

United States Patent Office 3,178,153
Patented Apr. 13, 1965

3,178,153
FIRE RETARDER AND OIL BARRIER
Arthur H. Jacomet, Phoenix, Ariz., assignor to The Garrett Corporation, Los Angeles, Calif., a corporation of California
Filed May 3, 1963, Ser. No. 277,937
7 Claims. (Cl. 253—39)

The present invention relates to barrier means having pyrostatic capabilities. More specifically, the device relates to a barrier having spaced walls that form a container for fire extinguishing material, making the latter available for expulsion from any breach that may occur in the barrier. The invention is particularly useful in preventing fire damage to machines which are susceptible to accidents that would open oil or fuel chambers to regions of high temperature or high velocity air.

An object of the invention is to provide certain machinery with partitions having integrated pyrostatic means.

Another object of the invention is to provide an improved safety system for high-speed machinery.

A further object of the invention is to provide an anticombustion shield for separating the hot portions of a machine from adjacent combustible materials.

A still further object of the invention is to provide projectile containment apparatus with integral heat insulating and fire extinguishing means.

Another object of the invention is to provide a double-walled shroud between the hot gas passage and lubricant containing chambers in turbine apparatus to prevent the entrance of said lubricant into said passage.

A still further object of the invention is to provide a double-walled barrier adjacent turbine wheels or other high-speed rotors for deflecting or catching all fragments that may accidentally separate from the wheel or rotor and simultaneously eject fire extinguishing material from regions of the barrier where said fragments have penetrated one of the walls.

Another object of this invention is to provide a gas turbine engine having a double-walled shroud disposed between the turbine wheel and oil sump, said shroud forming a gas-tight seal between said wheel and sump and also defining an annular chamber which may hold a powder, liquid or gaseous fire extinguishing material for release into the region of the turbine wheel if anything should puncture the shroud wall.

Figure 1:
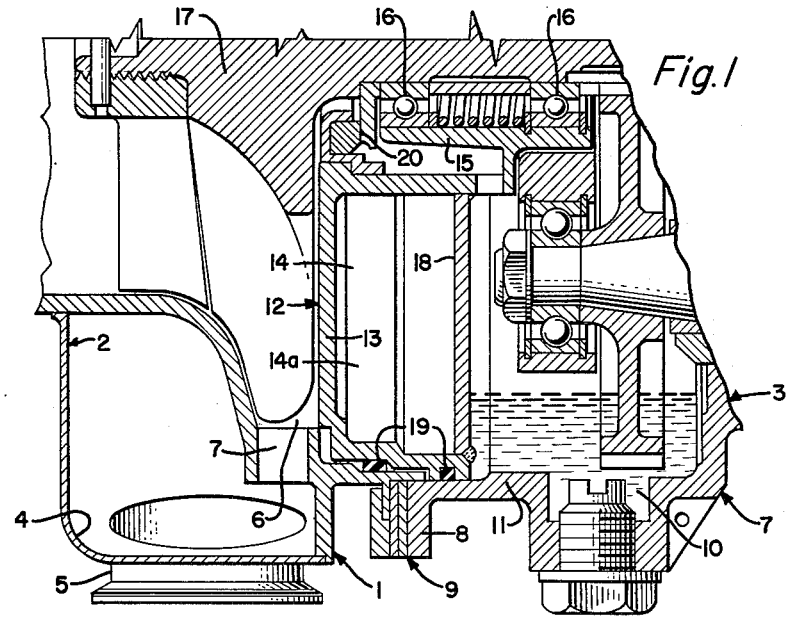
Figure 2:
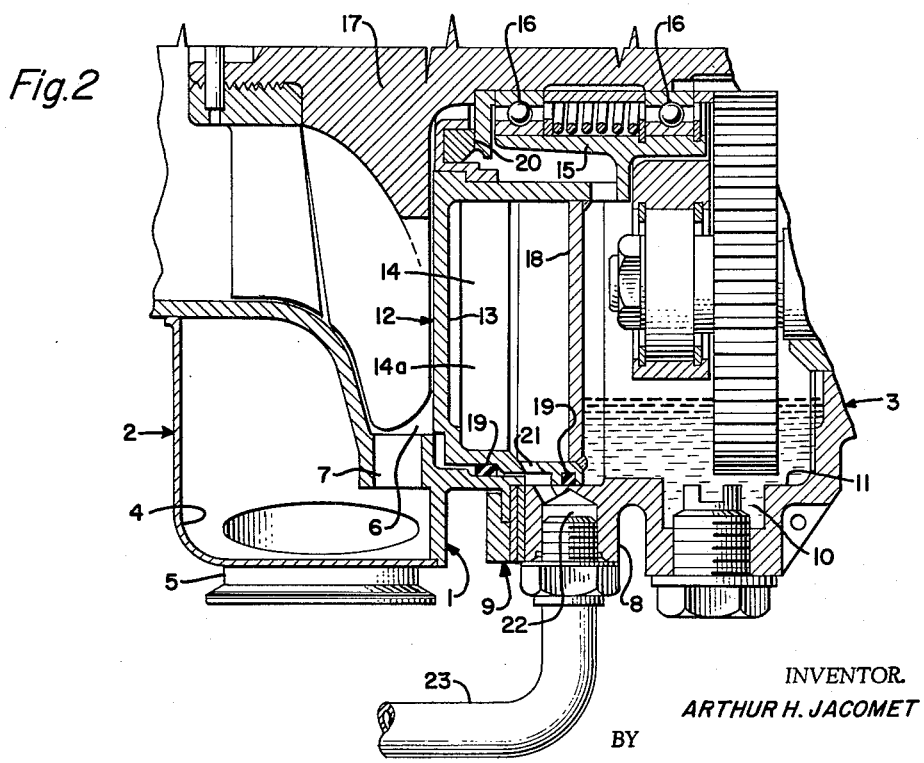

Other advantages and objects of the invention will become more fully appreciated with understanding gained from the following detailed description and accompanying drawings wherein:

FIG. 1 is a fragmentary axial sectional view of a gas turbine engine starter which incorporates one form of the invention; and FIG. 2 is a view very similar to FIG. 1, but shows a modified form of the invention.

Since many of the parts are the same in both figures of the drawing, like parts will be indicated by the same reference numerals.

The present concept is shown applied to a machine that is very familiar to persons skilled in the turbine art; consequently, much of the structure not directly pertinent to the invention is not shown.

As shown in FIGS. 1 and 2, the apparatus includes a casing 1 having a first section 2 formed to receive and direct high-temperature gas through a series of passages to a turbine, and a second section 3 which defines a transmission chamber the lower portion of which forms a reservoir or sump that contains oil or other lubricant for the gears and bearing of the transmission.

The section 2 comprises an annular plenum 4 having an inlet 5 which establishes communication between a source of high-temperature gas and the plenum. The source of gas is not shown in the drawings but it may be any one of several well-known gas generators or storage means that are commonly employed with gas turbines and starters. The plenum 4 communicates with a passage 6 via a ring of tangentially directed nozzles or vanes 7.

The section 3 of the casing 1 has flange means 8 that cooperates with a complemental portion of the section 2 to form an annular connection 9 between the first and second sections of the casing. An oil sump 10 is defined by a portion 11 of the second section 3.

Means indicated at 12 are disposed interiorly of the casing 1 to form a partition which acts as a barrier against the entrance of heat or particles into the sump 10 from any part of the passage 6. The means 12 comprises a first wall 13 which closes one side of the passage 5 and defines an annular channel 14. The wall 13 also comprises an appendage 15 for supporting bearings 16 which carry the journaled portion of a rotor or wheel 17. A second wall 18 is welded or otherwise secured to the wall 13 for closing the channel 14 and completing a closed chamber 14a. Packings are provided at 19 and a running face seal is provided at 20 to prevent leakage of oil from the sump 10 into the passage 6.

The double wall construction of the present device offers several very important advantages over single-walled barriers. One of these advantages is that one wall may be severely damaged or even destroyed by a turbine wheel burst and/or bearing failure without impairing the sealing function of the other, whereas a minor puncture of a single wall would seriously limit the effectiveness of the unit. It is obvious that when only one wall is used a small opening therein could cause an explosion or fire. Another advantage of the double-walled construction is that one wall may be extremely hot and still not adversely affect the oil adjacent the second wall because of the heat absorbing and dissipating properties of the insulating space between the walls. The problem of localized heating or "hot spots" is also eliminated by the use of two spaced walls because the separation of the walls prevents straight-through conduction of heat.

The most distinguishing feature of the present invention, however, is the use of the space between the first and second wall to contain fire extinguishing material which is automatically released when one of the walls is punctured. In the form of the invention shown in FIG. 1 of the drawings, the chamber 14a is simply filled or packed with any suitable chemical which may be used to prevent combustion. In this instance, one of the powdered forms of fire extinguishing material is preferred because exposure to heat does not elevate the pressure of the material. Many of these powders are also excellent heat insulators and may consequently be utilized as such while it is stored in the chamber. The use of powder in the space between the shield walls additionally provides an ideal cushion which will effectively stop flying fragments that have penetrated the first wall.

Although the device shown in FIG. 1 is entirely adequate in most instances, it is occasionally desirable to have a replenishable supply of extinguishing material, or it may be convenient to connect the device with a source of fluid under pressure to assist in forcing the material from its container. One form of such means is illustrated in FIG. 2 of the drawing which shows a passage 21 formed in the casing 1 for establishing communication between the chamber 14a and a supply line 23. The latter extends from its point of connection with the casing 1 to a source of pressurized inert gas or other fire extinguishing fluid. Although the source of pressure just mentioned is not shown, it should be obvious that many suitable sources are available.

I claim:
1. In a hot gas turbine driven engine starting mechanism, the combination comprising:
   (a) a casing formed to include a hot gas directing portion and a reservoir for storing combustible fluids;
   (b) energy conversion means disposed for motivation by gas forces in said hot gas directing portion;
   (c) a partition for isolating said reservoir from said hot gas directing portion; and
   (d) means integral with said partition for defining at least one fully closed dead air chamber to contain fire extinguishing material, the latter being available for immediate release into said casing upon the occurrence of a breach in said partition.

2. In a hot gas turbine driven engine starter, the combination comprising:
   (a) a casing formed to include a hot gas directing portion and a reservoir for storing combustible fluids;
   (b) energy conversion means disposed for motivation by gas forces in said hot gas directing portion;
   (c) a partition for isolating said reservoir from said hot gas directing portion;
   (d) means integral with said partition for defining at least one gas tight chamber to contain fire extinguishing material, the latter being available for immediate release into said casing upon the occurrence of a breach in said partition; and
   (e) means for replenishing said material as it is released from said chamber.

3. In a hot gas turbine driven engine starter, the combination comprising:
   (a) a casing formed to include a hot gas directing portion and a reservoir for storing combustible fluids;
   (b) energy conversion means disposed for motivation by gas forces in said hot gas directing portion;
   (c) a first wall disposed to isolate said reservoir from said hot gas directing portion; and
   (d) a second wall in gas tight spaced relation from said first wall, said second wall serving to isolate said hot gas directing portion from said reservoir in the event of damage to said first wall.

4. In a hot gas turbine driven engine starter, the combination comprising:
   (a) a casing formed to include a hot gas directing portion and an oil sump;
   (b) a turbine wheel disposed for motivation by gas forces in said hot gas directing portion;
   (c) a first wall disposed adjacent said wheel and forming seal means which isolates said hot gas directing portion from said sump;
   (d) a second wall cooperating with said first wall to define a gas tight chamber, said second wall serving to isolate said hot gas directing portion from said sump in the event of damage to said first wall; and
   (e) fire extinguishing material disposed within said gas tight chamber for release therefrom upon the occurrence of a breach in one of said walls.

5. In a hot gas turbine driven engine starting mechanism of the type having a casing with a turbine wheel receiving compartment and a lubricant receiving transmission chamber in side-by-side relationship, a fire retarder and oil barrier, comprising:
   (a) an annular element disposed between said turbine wheel compartment and transmission chamber and having inner and outer annular walls with end walls extending therebetween to form a gas tight dead air space, one of said end walls also serving as a shroud for one side of the turbine wheel in the turbine wheel receiving compartment; and
   (b) sealing means disposed between said outer annular wall and said casing and between said inner annular wall and the shaft of the turbine wheel.

6. In a hot gas turbine driven engine starting mechanism of the type having a casing with a turbine wheel receiving compartment and a lubricant receiving transmission chamber in side-by-side relationship, a fire retarder and oil barrier, comprising:
   (a) an annular element disposed between said turbine wheel compartment and transmission chamber, said element having inner and outer annular walls and end walls extending therebetween to form a gas tight dead air space, one of said end walls serving as a closure for one side of the turbine wheel receiving compartment and the other serving as a closure for one side of said transmission chamber, said dead air space receiving a quantity of fire extinguishing material; and
   (b) sealing means disposed between the outer annular wall and said casing and between said inner annular wall and the shaft of the turbine wheel.

7. In a hot gas turbine driven engine starting mechanism:
   (a) a casing having a pair of separable sections, one providing a turbine wheel receiving compartment and the other a transmission chamber;
   (b) a fire retarder and oil barrier removably disposed in said casing at the juncture between said separable sections, said fire retarder and oil barrier having inner and outer annular walls and end walls extending therebetween to form a gas tight dead air space, one end wall also serving as a shroud for one side of the turbine wheel in the turbine wheel receiving compartment; and
   (c) sealing means disposed between the outer annular wall and said casing and between the inner annular wall and the shaft of a turbine wheel in the turbine wheel compartment.

References Cited by the Examiner

UNITED STATES PATENTS

| | | | |
|---|---|---|---|
| 969,760 | 9/10 | Moss | 253—39 |
| 2,646,210 | 7/53 | Kohlmann et al. | 253—55 |
| 3,001,586 | 9/61 | Kyle | 169—2 |
| 3,054,554 | 9/62 | Buchi | 253—39 |

FOREIGN PATENTS

| | | |
|---|---|---|
| 628,697 | 9/49 | Great Britain. |
| 897,907 | 5/62 | Great Britain. |

JOSEPH H. BRANSON, Jr., *Primary Examiner.*